US012659360B2

(12) United States Patent
Bisht et al.

(10) Patent No.: US 12,659,360 B2
(45) Date of Patent: Jun. 16, 2026

(54) SYSTEM AND METHOD FOR MANAGING COMMUNICATION REQUESTS IN A NETWORK

(71) Applicant: JIO PLATFORMS LIMITED, Ahmedabad (IN)

(72) Inventors: Birendra Singh Bisht, Navi Mumbai (IN); Harbinder Pal Singh Saini, Navi Mumbai (IN); Anurag Sinha, Mumbai (IN); Priyanka Singh, Maharashtra (IN); Srikanth Reddy, Peddapur (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 270 days.

(21) Appl. No.: 18/247,576

(22) PCT Filed: Mar. 24, 2023

(86) PCT No.: PCT/IB2023/052915
§ 371 (c)(1),
(2) Date: Mar. 31, 2023

(87) PCT Pub. No.: WO2023/187567
PCT Pub. Date: Oct. 5, 2023

(65) Prior Publication Data
US 2024/0356989 A1      Oct. 24, 2024

(30) Foreign Application Priority Data
Mar. 30, 2022    (IN) .............................. 202221018956

(51) Int. Cl.
*H04L 65/1069* (2022.01)
*H04L 41/06* (2022.01)
(Continued)

(52) U.S. Cl.
CPC .......... *H04L 65/1069* (2013.01); *H04L 41/06* (2013.01); *H04L 65/1016* (2013.01); *H04L 65/1046* (2013.01)

(58) Field of Classification Search
CPC ............. H04L 65/1016; H04L 65/1046; H04L 65/1069; H04L 41/06
(Continued)

(56) References Cited

U.S. PATENT DOCUMENTS 9,584,559 B2 * 2/2017 Noldus ............... H04L 65/1069
10,341,468 B2    7/2019 Hala et al.
(Continued)

FOREIGN PATENT DOCUMENTS

WO      WO-2010028369 A1 *  3/2010  ............. H04L 69/10

OTHER PUBLICATIONS

International Search Report and Written Opinion for PCT International Application No. PCT/IB2023/052915, dated Jul. 10, 2023, 7 pages.
(Continued)

*Primary Examiner* — Glenford J Madamba
(74) *Attorney, Agent, or Firm* — FINNEGAN, HENDERSON, FARABOW, GARRETT & DUNNER LLP

(57) ABSTRACT

The present disclosure provides a system and a method to manage volume of communication requests in a network. The system may include a network device that may be communicably operational with an Internet Protocol Multimedia Subsystem (IMS) server and a centralized data layer (CDL) server. The network device may receive a communication request from a user device through the IMS server. The network device may transmit the communication request and a set of information to the CDL server. The CDL server may assess allowance of the communication request
(Continued)

100 ⟶ that originated from the user device. The assessment may check if the number of communication requests in a circle or between circles may have exceeded a pre-defined limit. Based on the assessment, if the pre-defined limit may not be exceeded, then the CDL server may provide an indication of allowance of the communication request received from user device.

18 Claims, 11 Drawing Sheets

(51) Int. Cl.
*H04L 65/1016* (2022.01)
*H04L 65/1046* (2022.01)
(58) Field of Classification Search
USPC ........................................................ 709/227
See application file for complete search history.

(56) References Cited

U.S. PATENT DOCUMENTS

| | | | | |
|---|---|---|---|---|
| 11,991,046 | B2 * | 5/2024 | Wu | .......................... H04L 41/22 |
| 2008/0162637 | A1 * | 7/2008 | Adamczyk | ............ H04L 51/043 |
| | | | | 709/204 |
| 2011/0072141 | A1 * | 3/2011 | Veenstra | ............. H04L 65/1045 |
| | | | | 709/228 |
| 2016/0353261 | A1 * | 12/2016 | Thippesh | ................ H04L 65/80 |
| 2020/0241936 | A1 | 7/2020 | Milliron et al. | |

OTHER PUBLICATIONS

Final Approved Study paper of NGS division on TAS, Telecommunication Engineering Centre, Ministry of Communications & Information Technology, Government of India Mar. 31, 2017, 18 pages.

* cited by examiner

100

200

NETWORK DEVICE / BTAS
102

| PROCESSOR(S) 202 | MEMORY 204 | INTERFACE(S) 206 |

PROCESSING ENGINE
208

SESSION MANAGER (SM)
212

OAM MANAGER (OM)
214

PROVISIONING AGENT (PA)
216

DATABASE MANAGER (DM)
218

TROUBLESHOOT MANAGER
220

CDL AGENT
230

DATABASE
210

800

SYSTEM AND METHOD FOR MANAGING COMMUNICATION REQUESTS IN A NETWORK

RESERVATION OF RIGHTS

A portion of the disclosure of this patent document contains material, which is subject to intellectual property rights such as but are not limited to, copyright, design, trademark, integrated circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to systems and methods for regulating traffic for voice communication in wireless networks. More particularly, the present disclosure relates to a system and a method for managing communication requests in a network that is efficient and controls a number of calls in a particular closed user group (CUG).

BACKGROUND OF INVENTION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

Quality of service in a wireless communication network is a challenging issue as multiple radio channels for mobility of voice communications are utilized by multiple users. Further, a communication network may be considered as having multiple cells with unidirectional links, where each cell has limited bandwidth. For example, when a new call is originated in a cell, one of the channels assigned to a base station of the cell is used for communication between a mobile user and the base station. If all the channels assigned to this base station are in use, the call attempt is assumed to be blocked and cleared.

When a new call gets a channel, it keeps the channel until either the call is completed inside the cell or the mobile station (user) moves out of the cell. When the call is completed, the channel is released and becomes available to serve another call. When the mobile user requests service, the request may be granted or denied based on a successful handoff established by the mobile station. Failure to launch a successful handoff may generate a forced termination or a "call drop-off." In general, call dropping may generate a negative impact on the user. Hence, an efficient system may be required to counteract the identified problems associated with conventional systems.

There is, therefore, a need in the art to provide a system and a method that can mitigate the problems associated with the prior arts.

OBJECTS OF THE INVENTION

Some of the objects of the present disclosure, which at least one embodiment herein satisfies are listed herein below.

It is an object of the present disclosure to provide a system and a method that uses a business telephony application server (BTAS) which provides session initiation protocol (SIP) trunking and internet protocol (IP) centrex services to customers.

It is an object of the present disclosure to provide a system and a method that uses the BTAS to provide supplementary services like a closed user group (CUG), short code dialling, and conferencing to customers.

It is an object of the present disclosure to provide a system and a method with the BTAS that uses a call admission control (CAC) service to simultaneously control a number of calls in a particular CUG.

It is an object of the present disclosure to provide a system and a method with the BTAS that uses a circle based CAC with a centralized data layer (CDL) server that keeps an account of the number of calls in a circle based CAC.

It is an object of the present disclosure to provide a system and a method that uses the BTAS with a circle based CDL for catering circle specific data access requirements.

It is an object of the present disclosure to facilitate an effective and improved management of traffic volume pertaining to communication requests.

It is an object of the present disclosure to facilitate an economical and next generation based system and a method that can eliminate network congestion or overload due to excess traffic, thus making the network service to improve the efficiency and quality of the service.

It is an object of the present disclosure to facilitate a system and a method that can enable managing volume of communication requests within a circle or between multiple circles.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for establishing one or more connections. The system may include one or more processors operatively coupled with a business telephony application server (BTAS). The one or more processors may be coupled with a memory that stores instructions to be executed by the one or more processors. The one or more processors may receive one or more communication requests from one or more user devices via a communication network. The one or more communication requests may be based on one or more input parameters. The one or more processors may transmit the one or more communication requests to a centralized data layer (CDL) server via the communication network. The CDL server may be configured to approve the received one or more communication requests based on one or more predefined rules. The one or more processors may receive the approved one or more communication requests from the CDL server via the communication network. The one or more processors may establish the one or more connections between the one or more user devices and the BTAS based on the approved one or more communication requests.

In an embodiment, the one or more processors may be configured to process the one or more communication requests and enable one or more service chain logic executions associated with the one or more communication requests.

3

4

In an embodiment, the one or more processors may be configured to manage fault, configuration, and performance associated with the one or more communication requests.

In an embodiment, the one or more processors may be configured to store one or more database clusters and update changes associated with the one or more communication requests in the one or more database clusters.

In an embodiment, the one or more processors may be configured to debug the one or more database clusters associated with the one or more communication requests.

In an embodiment, the CDL server may be configured with one or more call admission control (CAC) services to process the one or more communication requests.

In an embodiment, the CDL server may be configured with any or a combination of a circle based call admission control (CAC) service and a centralized CAC service to process the one or more communication requests.

In an embodiment, the one or more input parameters may include at least one of enterprise identification (ID), closed user group (CUG) ID, call admission control (CAC) policies, and one or more channels used by the CAC policies.

In an embodiment, the one or more predefined rules of the CDL server may be based on one or more verifications from an external server. The external server may be configured to verify the one or more input parameters associated with the one or more user devices.

In an embodiment, the CDL server may be configured with a timer to record the one or more communication requests from the one or more user devices and transmit the one or more communication requests to the external server for the one or more verifications.

In an embodiment, the one or more CAC services may include at least one CAC cluster to process the one or more communication requests.

In an aspect, the present disclosure relates to a method for establishing one or more connections. The method may include receiving, by one or more processors, one or more communication requests from one or more user devices via a communication network. The one or more processors may be operatively coupled with a business telephony application server (BTAS). The one or more communication requests may be associated with one or more input parameters. The method may include transmitting, by the one or more processors, the one or more communication requests to a CDL server via the communication network. The CDL server may be configured to approve the one or more communication requests based on one or more predefined rules. The method may include receiving, by the one or more processors, the approved one or more communication requests from the CDL server via the communication network. The method may include establishing, by the one or more processors, the one or more connections between the one or more user devices and the BTAS based on the approved one or more communication requests.

In an embodiment, the method may include processing, by the one or more processors, the one or more communication requests and enabling one or more service chain logic executions associated with the one or more communication requests.

In an embodiment, the method may include managing, by the one or more processors, fault, configuration, and performance associated with the one or more communication requests.

In an embodiment, the method may include storing, by the one or more processors, one or more database clusters and updating changes associated with the one or more communication requests in the one or more database clusters.

In an embodiment, the method may include debugging, by the one or more processors, the one or more database clusters associated with the one or more communication requests.

In an aspect, the present disclosure relates to a user equipment (UE) for establishing one or more connections. The UE may include one or more processors communicatively coupled to one or more processors in a system. The one or more processors may be coupled with a memory that stores instructions to be executed by the one or more processors that causes the UE to transmit one or more communication requests to the one or more processors via a communication network. The one or more processors may be operatively coupled to a BTAS, where the one or more processors may be configured to receive the one or more communication requests from the UE. The one or more processors may transmit the one or more communication requests to a CDL server via the communication network. The CDL server may be configured to approve the one or more communication requests based on one or more predefined rules. The one or more processors may receive the approved one or more communication requests from the CDL server via the communication network. The one or more processors may establish the one or more connections between the UE and the BTAS based on the approved one or more communication requests.

In an aspect, a non-transitory computer readable medium may include a processor with executable instructions that may cause the processor to receive one or more communication requests from one or more user devices via a communication network. The one or more communication requests may be based on one or more input parameters. The processor may transmit the one or more communication requests to a centralized data layer (CDL) server via the communication network. The CDL server (104) may be configured to approve the received one or more communication requests based on one or more predefined rules. The processor may receive the approved one or more communication requests from the CDL server via the communication network. The processor may establish one or more connections between the one or more user devices and a business telephony application server (BTAS) based on the approved one or more communication requests.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 1A:
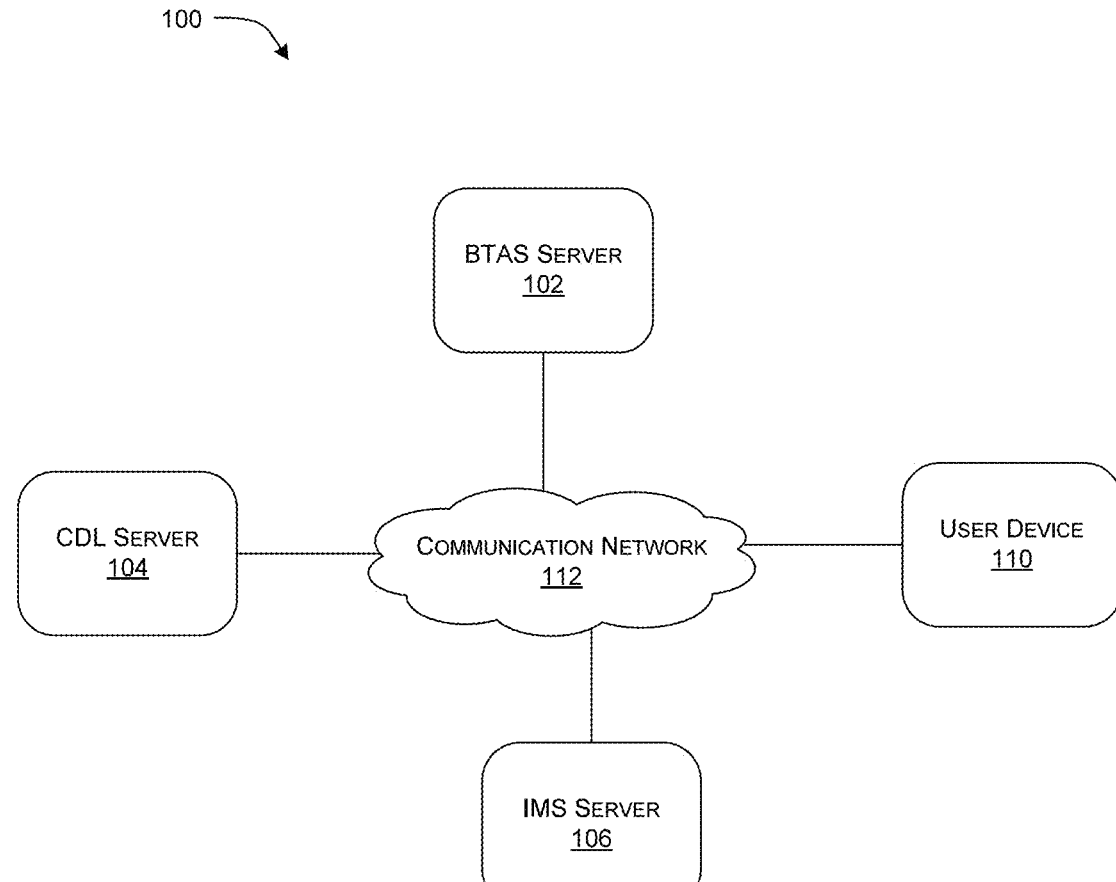
FIG. 1A illustrates an exemplary network architecture (100) in which or with which a system of the present disclosure may be implemented, in accordance with an embodiment of the present disclosure.

The foregoing shall be more apparent from the following more detailed description of the disclosure.

BRIEF DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an", and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The various embodiments throughout the disclosure will be explained in more detail with reference to FIGS. 1-8.

FIG. 1A illustrates an exemplary network architecture (100) in which or with which a proposed system may be implemented, in accordance with an embodiment of the present disclosure.

As illustrated in the network architecture (100) in FIG. 1A, the present disclosure relates to a system for controlling traffic volume of communication requests in a network. In an embodiment, the network architecture (100) may include a network device (102) (network device hereinafter interchangeably referred to as a business telephony application server or BTAS server (102)) that may be configured to facilitate managing the volume of the communication requests from a user device (110) through a communication network (112). It may be appreciated that although a single user device (110) is shown for the sake of simplicity, the user device (110) may include multiple user devices (110). The BTAS server (102) may be integrated with an internet protocol multimedia subsystem (IMS) server (106) (also interchangeably referred to as IMS or IMS core). The IMS server (106) may include, but is not limited to, a third generation (3G) network, a fourth generation (4G) network, a fifth generation (5G) network, a wireless fidelity (Wi-Fi) network, any other wireless networks or combination thereof, and the like. Further, the IMS server (106) may be accessed through the communication network (112). In an embodiment, the user device (110) may be connected to a centralized data layer (CDL) server or framework (104) through the communication network (112). The CDL server (104) may access information stored across different physical hosts in multiple or different circles/clusters to manage the volume of incoming communication requests through the BTAS server (102).

The user device (110) may include, but not be limited to, a mobile, a laptop, etc. Further, the user device (110) may include a smartphone, virtual reality (VR) devices, augmented reality (AR) devices, a general-purpose computer, desktop, personal digital assistant, tablet computer, and a mainframe computer. Additionally, input devices for receiving input from a user such as a touch pad, touch-enabled screen, electronic pen, and the like may be used. A person of ordinary skill in the art will appreciate that the user device (110) may not be restricted to the mentioned devices and various other devices may be used.

The communication network (112) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The communication network (112) may also include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

Although FIG. 1A shows exemplary components of the network architecture (100), in other embodiments, the network architecture (100) may include fewer components, different components, differently arranged components, or additional functional components than depicted in FIG. 1A. Additionally, or alternatively, one or more components of the network architecture (100) may perform functions described as being performed by one or more other components of the network architecture (100).

Figure 1B:
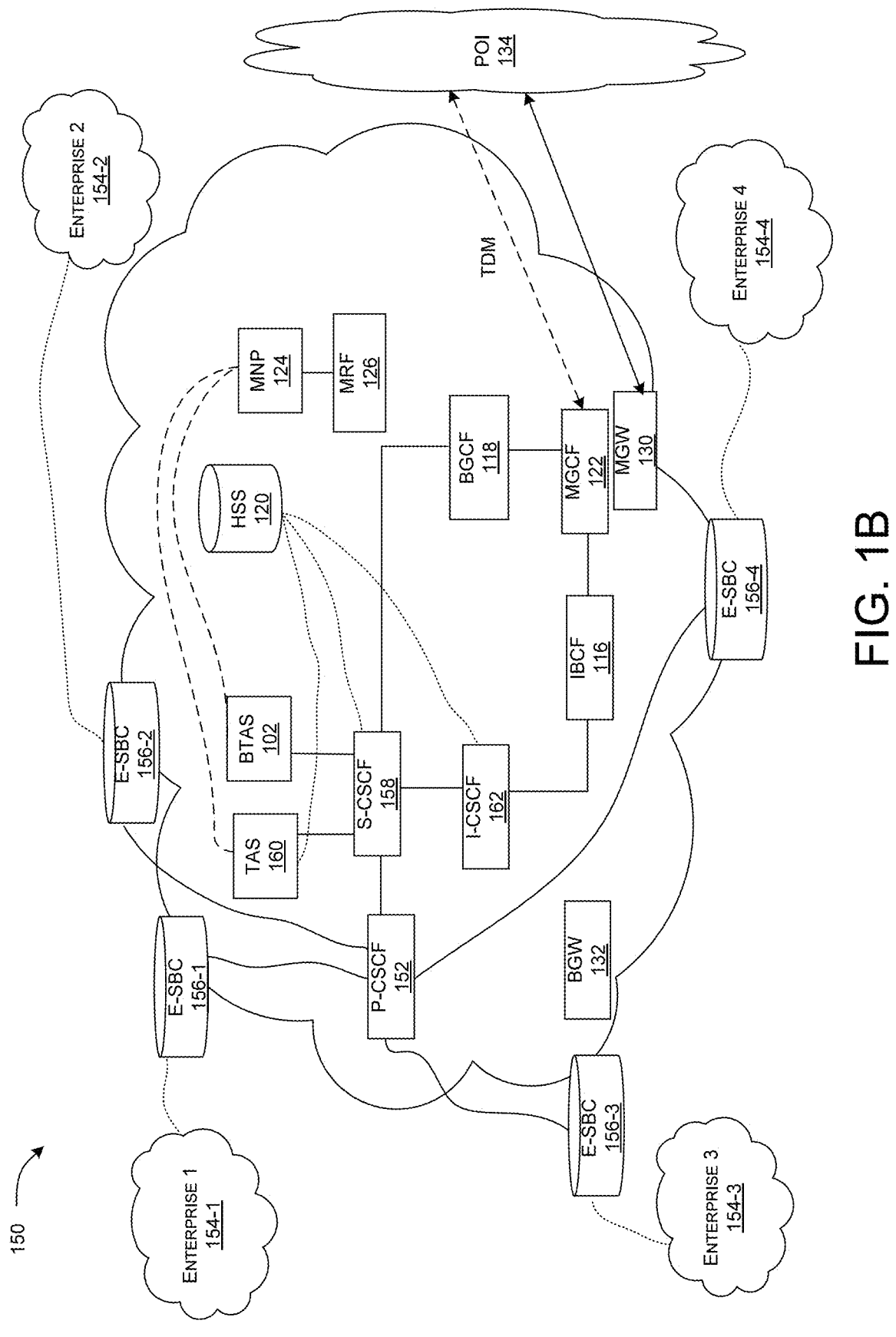
FIG. 1B illustrates an exemplary high-level system architecture (150) of a proposed system, in accordance with an embodiment of the present disclosure.

FIG. 1B illustrates an exemplary high-level system architecture (150) of a proposed system, in accordance with an embodiment of the present disclosure.

In reference to FIG. 1B, the communication network (112) (as specified in FIG. 1A) may be provided to multiple entities or enterprises, such as, for example, an enterprise-1 (154-1), an enterprise-2 (154-2), an enterprise-3 (154-3), and an enterprise-4 (154-4) (collectively termed as enterprise 154). As shown in FIG. 1B, each enterprise, the enterprise-1 (154-1), the enterprise-2 (154-2), the enterprise-3 (154-3), and the enterprise-4 (154-4) may be facilitated with the communication network (112) through E-SBC (156-1, E-SBC (156-2). E-SBC (156-3), and E-SBC (156-4), respectively.

The IMS server (106 of FIG. 1A) may include one or more modules or components that may perform one or more functions. For example, the IMS server (106) may include a serving call session control function module (S-CSCF) (158), an interrogating call session control function module (I-CSCF) (162), and a proxy call session control function module (P-CSCF) (152). In another example, the other application server may include a mobile number portability (MNP) server (124), which may provide number portability to the user device (110).

In reference to the components pertaining to the IMS server (106), the S-CSCF module (158) may be a primary node in the IMS server (106) responsible for session control. In an embodiment, a list of subscribers may be allocated to respective S-CSCF module (158) at the time of IMS registration in order to facilitate routing of session initiation protocol (SIP) messages. In operation, the S-CSCF module (158) may enable downloading a subscriber profile from a home subscriber server (HSS) (120) at the time of IMS registration. The I-CSCF module (162) may be a key element in the IMS server (106) and may enable any request to be routed to an appropriate S-CSCF module (158) from multiple S-CSCF modules within the network (112). The I-CSCF module (162) may also interrogate the HSS (120) to obtain an address of the relevant S-CSCF module (158) to further process an SIP initiation request. The P-CSCF module (152) may perform general functions such as, onward routing of registration and session requests to the correct nodes in the communication network (112), updating the S-CSCF module (158), maintaining a secure connection with the user device (110), and other such functions. In an exemplary embodiment, the telephony application server (TAS) (160) and the BTAS (102) may be integrated with one or more functional components for an SIP based application server. The SIP application server may be built with features pertaining to the enterprise 4 (154-4).

Further, as shown in FIG. 1B, a breakout gateway control function (BGCF) module (118), a media gateway control function module (MGCF) (122), and an interconnect border control function module (IBCF) (116) may also be included with particular functionalities. In a general implementation, the BGCF module (118) may provide routing call signalling to and from the most appropriate S-CSCF module (158). In the present implementation, the BGCF module (118) may route calls from the BTAS (102) for managing volume of the communication requests. In general, the MGCF module (122) may be an SIP endpoint that can interface with security gateway (SGW) and may also control resources in media gateway (MGW) (130). The IBCF module (116) may enable boundary control between various service provider networks, thus providing BTAS enabled IMS network security in terms of signalling information. The IMS server (106) may also include a multimedia resource function (MRF) module (126). The MRF module (126) in conjunction with other components of the IMS server (106) may be responsible for executing various processing tasks on media streams associated with particular services. Further, as shown in FIG. 1B, as the BTAS-IMS based implementation may be associated with point of interconnection (POI) (134), which may be a physical interface between media gateways of varying service providers or enterprises through time-division multiplexing (TDM).

Figure 2A:
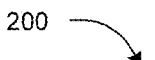
FIG. 2A illustrates an exemplary block diagram (200) of a proposed system, in accordance with an embodiment of the present disclosure.

FIG. 2A illustrates an exemplary block diagram (200) of a proposed system, in accordance with an embodiment of the present disclosure.

Referring to FIG. 2A, the business telephony application server (BTAS) (102) may comprise one or more processor(s) (202) that may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the BTAS (102). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as random-access memory (RAM), or non-volatile memory such as erasable programmable read only memory (EPROM), flash memory, and the like.

In an embodiment, the BTAS (102) may include an interface(s) (206). The interface(s) (206) may comprise a variety of interfaces, for example, interfaces for data input and output (I/O) devices, storage devices, and the like. The interface(s) (206) may also provide a communication pathway for one or more components of the system BTAS (102). Examples of such components include, but are not limited to, processing engine(s) (208), a database (210), a session manager (SM) (212), an operations administration management (OAM) manager (214), a provisioning agent (PA) (216), a database manager (DM) (218), a troubleshoot manager (TM) (220), and a CDL agent (230).

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the BTAS (102) may comprise the machine-readable storage medium storing the instructions and the processing resource to execute the instructions, or the machine-readable storage medium may be separate but accessible to the BTAS (102) and the processing resource. In other examples, the processing engine(s) (208) may be implemented by electronic circuitry.

In an embodiment, the one or more processors (202) may receive one or more communication requests from one or more user devices (110) via a communication network (112). The one or more communication requests may be based on one or more input parameters. The input parameters may include but not limited to an enterprise identification (ID), a closed user group (CUG) ID, a call admission control (CAC) policies, and one or more channels used by the CAC policies.

In an embodiment, the one or more processors (202) may transmit the one or more communication requests to a centralized data layer (CDL) server (104) via the communication network (112). The CDL server (104) may be configured to approve the received one or more communication requests based on one or more predefined rules. A CDL agent (230) may be configured with the CDL server (104) to process the received one or more communication requests based on one or more predefined rules.

In an embodiment, the one or more processors (202) may receive the one or more communication requests via a session manager (212) and process the one or more communication requests. The one or more processors (202) may store the one or more communication requests in a database (210) where a database manager (DM) (218) may be configured to manage the database (210). The one or more processors (202) may enable one or more service chain logic executions associated with the received one or more communication requests.

In an embodiment, the one or more processors (202) may be configured to manage fault, configuration, and performance associated with the received one or more communication requests via a provisioning agent (PA) (216) and a troubleshoot manager (220).

In an embodiment, the one or more processors (202) may be configured to store one or more database clusters in the database (210) and update changes associated with the received one or more communication requests in the one or more database clusters via the (PA) (216).

In an embodiment, the one or more processors (202) may be configured to debug the one or more database clusters via an open code protocol accelerator module (OAM) manager (214) associated with the received one or more communication requests.

Figure 2B:
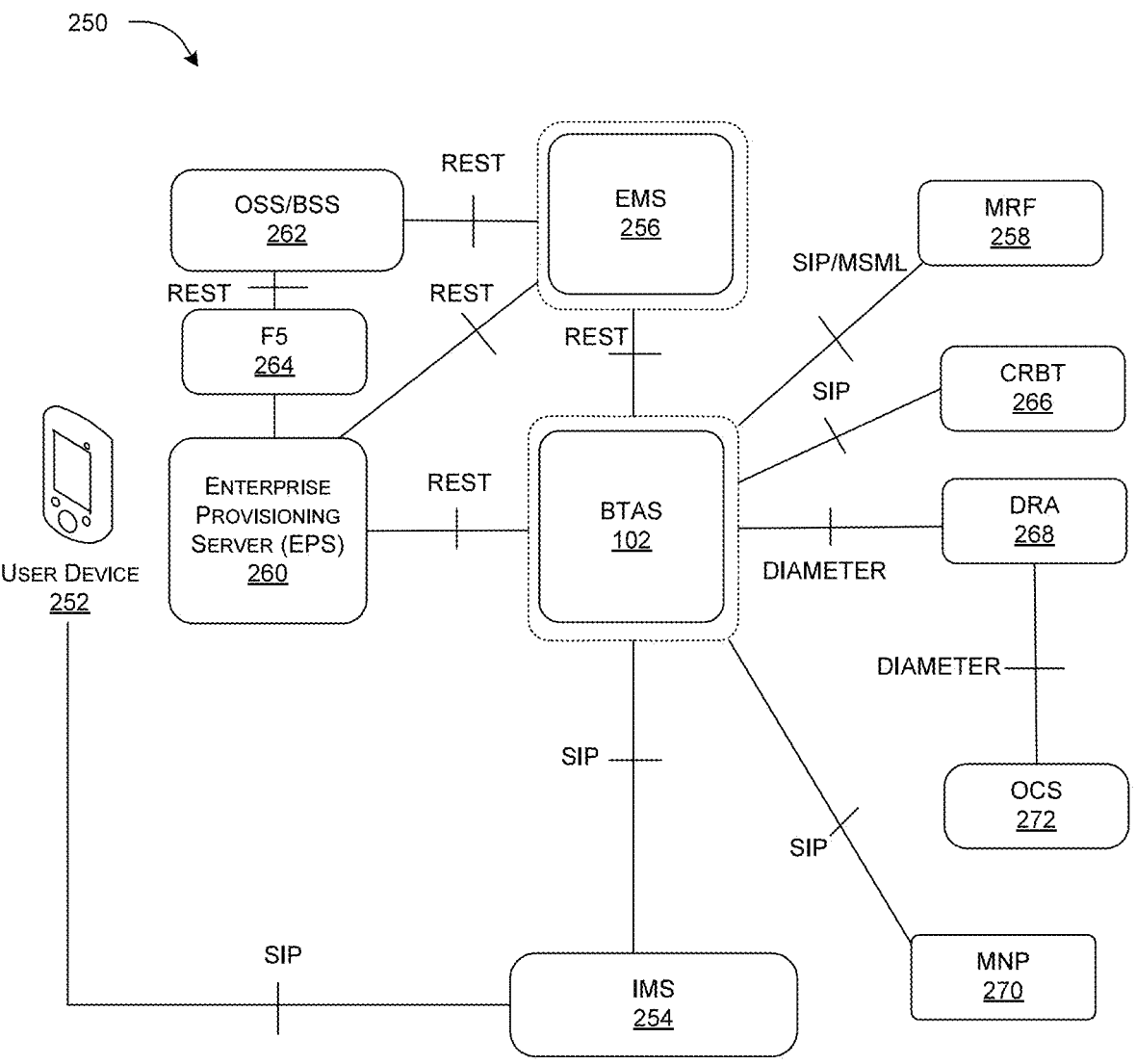
FIG. 2B illustrates an exemplary system architecture (250) of a proposed business telephony exchange server (BTAS), in accordance with an embodiment of the present disclosure.

FIG. 2B illustrates an exemplary system architecture (250) of a proposed BTAS, in accordance with an embodiment of the present disclosure.

As shown in FIG. 2B, the BTAS (102) may be integrated or coupled with various hardware/software components or servers for enabling one or more functions for managing the volume of communication requests. The BTAS (102) may be integrated with an IMS server (254) (previously IMS (106) in FIG. 1A) to enable the communication processing pertaining to a user device (252) (previously user device (110) in FIG. 1A). In an example embodiment, the BTAS (102) may be integrated with the IMS server (254) to establish and control communication connections via network protocol including, but not limited to, session initiation protocol (SIP). As the communication may also involve use of media in one or more forms, the BTAS (102) may integrate with multimedia resource function (MRF) (258) through a SIP/media server mark-up language (MSML) protocol. The BTAS (102) may interface with an enterprise provisioning server (EPS) (260) via representational state transfer (REST) protocol to enable provisioning of service data.

In an exemplary embodiment, the BTAS (102) may be integrated or coupled with other components/services such as mobile number portability (MNP) (270) via SIP for enabling number portability dipping. In another example embodiment, the BTAS (102) and the evolved packet system (EPS) (260) may be independently integrated or coupled with element management system (EMS) (256) via REST. The EMS (256) may include hardware and software implementation for managing the five key aspects i.e. fault, configuration, accounting, performance, and security (FCAPS) functionality via the REST protocol to exchange messages pertaining to the key aspects that can use hypertext transfer protocol (HTTP) to transport the messages. The EMS (256) may provide foundation to implement operations support system (OSS) or business support systems (BSS) based architecture that enable service providers to meet customer needs for example, for rapid deployment of services, to enable providing satisfying quality of service requirements, and other such services. The EMS (256) may interface with OSS/BSS (262) via REST protocol to enable a northbound interface for FCAPS data of BTAS/EPS. The term northbound interface may relate to an interface that allows a particular component of a network to communicate with a higher-level component. Further, the OSS/BSS (262) may interface with EPS (260) via REST protocol to manage service data management requests. Furthermore, the EPS (260) may be connected to the OSS/BSS (262) via F5 (264) and the F5 (264) may be communicating with the OSS/BSS (262) via REST.

Further, as shown in FIG. 2B, the BTAS (102) may be integrated or coupled with Diameter routing agent (DRA) (268) via Diameter protocol, which may be a standard protocol for authentication, authorization, and accounting information in the IMS server based network. The DRA may be a functional element that may provide real-time routing capabilities to ensure that messages are routed among the correct elements in a network. The integration of the BTAS (102) with the DRA (268) may enable integration with online charging system (OCS) (272) for facilitating Ro charging. The OCS (272) may be a system that allows a service provider to charge users or customers in real time based on service usage, and the Ro charging may pertain to a protocol that enables a trigger to generate charging events. In an embodiment, the BTAS (102) may also be integrated with components pertaining to customized caller ringback tone (CRBT) server (266) for enabling personalized ring-back tone (RBT) at the stage of establishing communication. For example, this may be mainly related to the ringback tone that may be played while connecting the user device (252) with entity device.

Figure 3A:
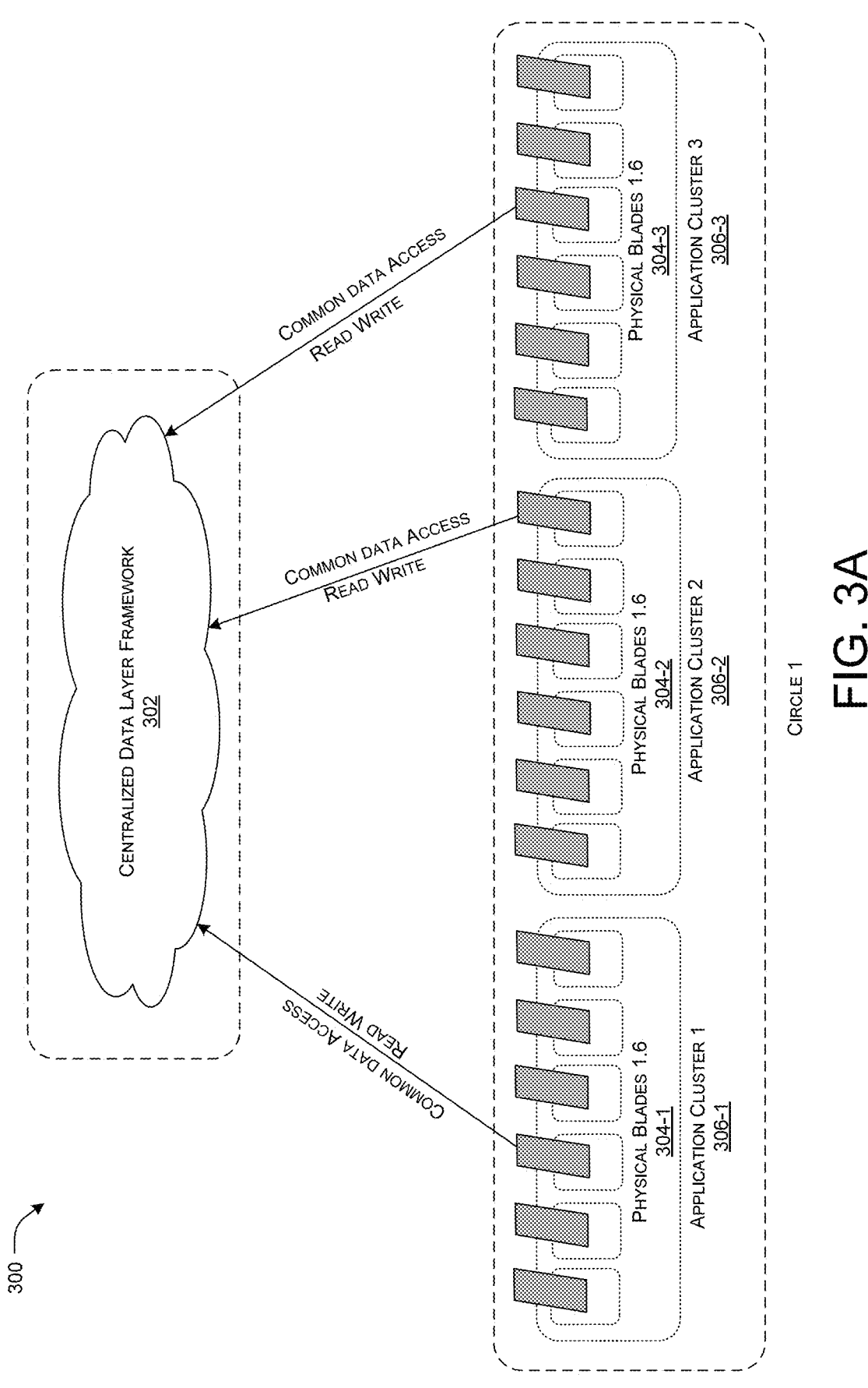
FIGS. 3A-3B illustrate exemplary centralized data layer (CDL) framework (300, 330), in accordance with an embodiment of the present disclosure.
Figure 3B:
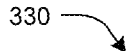
Figure 3B:
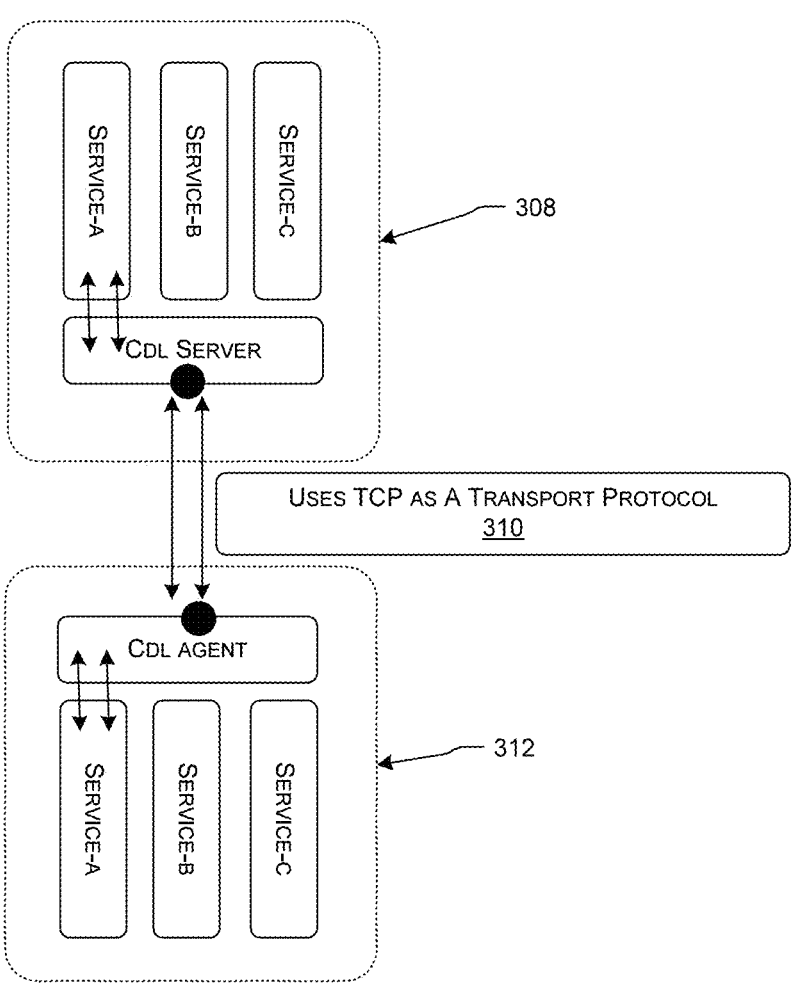

FIGS. 3A-3B illustrate exemplary CDL framework (300, 330), in accordance with an embodiment of the present disclosure.

As per a BTAS deployment architecture (300) shown in FIG. 3A, multiple clusters may be used to serve traffic of a single circle, for example, multiple clusters may serve traffic of circle 1. Further, each of the circles may have its own single CDL implementation, which may be in a super core. As shown in FIG. 3A, a CDL framework (302) may be implemented on "client-server" communication model. Further, as shown in FIG. 3A, application clusters, for example, application cluster 1 (306-1), application cluster 2 (306-2), and application cluster 3 (306-3) may communicate with respective CDL servers present in physical blades 1.6 (304-1, 304-2, 403-3). The physical blades 1.6 (304-1, 304-2, 304-3) may communicate with the CDL framework (302) using a common data access/read write protocol.

As illustrated in FIG. 3B, one or more services, for example, service-A, service-B, and service-C, associated with the CDL server (308) may integrate with the CDL agent (312). The services, service-A, service-B, and service-C, may communicate with the CDL agent (312) using a transmission control protocol (TCP) as a transport protocol (310). The CDL agent (312) may select one of the CDL server destinations IP based on service routing requirements. In an exemplary embodiment, the CDL server (308) may be responsible for interfacing with the CDL framework (302) and may respond to a data access request as received from the CDL agent (312).

In another embodiment, the CDL agent (312) and the CDL server (308) may primarily act as a backbone for transporting information between services present both at the client side and the server side respectively. To utilize the CDL framework (302), a new service may have to register itself with the CDL client and the CDL server so that the CDL framework (302) may route data access request/responses appropriately to correct service modules.

Figure 4:
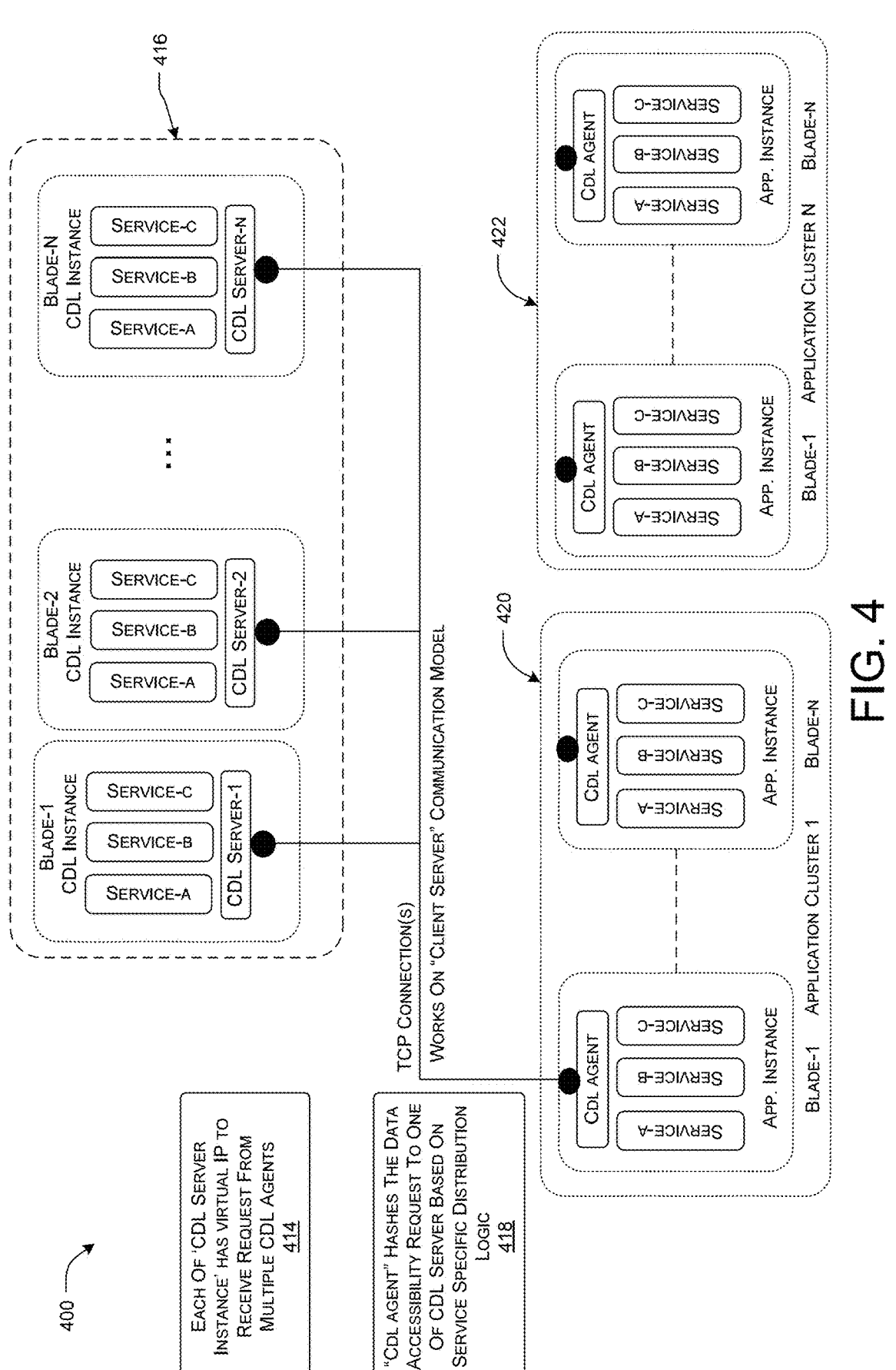
FIG. 4 illustrates an exemplary representation (400) of the CDL framework, in accordance with an embodiment of the present disclosure.

FIG. 4 illustrates an exemplary representation (400) of the CDL framework, in accordance with an embodiment of the present disclosure.

With respect to FIG. 4, a CDL agent (420) of an application cluster 1 and a CDL agent (422) of application cluster N may connect to the CDL servers (1, 2 . . . N) (416) via a TCP connection. In an embodiment, the CDL agents and the CDL servers (1, 2 . . . N) may communicate with each other, over a communication model using their own predefined header-body format. The header may be fixed in size and may contain one or more important information fields. This may be required to route a data access request and response. Further, the body may be variable in size and may depend upon a service type corresponding to various data access requests types. In an embodiment, the CDL agent may hash the data accessibility request to one of the CDL servers based on a service specific distribution logic (418). With respect to this, each of the CDL server instances may have a virtual IP (414) to receive a request from multiple CDL agents. By way of an example, a service-A at the CDL agent may require an insert, an update, a deletion, and a view data access operation, which may have variable body size requirements. The service data may be transported between the CDL agent and the CDL server in the form of a buffer and may be encoded/decoded by a service layer.

In an exemplary embodiment, the CDL servers (1, 2 . . . N) may be deployed through blade clusters (1, 2 . . . N). In an example, the single blade implementation may be appropriate for functional lab testing but without high availability (HA) (wherein process restart functionality may exist). In another example, the 2 blades implementation may be appropriate for functional lab testing with HA and may be recommended for field deployment where BTAS clusters may be lesser in number (for example less than 3 (<3)) or for BTAS at disaster recovery (DR) site. In an example, the 6 blades implementation may be suitable for field deployment where BTAS cluster that may be greater or equal to 3.

For example, considering implementation to be applicable in a particular place, which may include 4 BTAS clusters, each BTAS cluster may include 2 management blades and hence may include a total of 8 blades. This may be used for creating CDL cluster for the particular place's BTAS traffic. For example, in order to create 6 blade CDL clusters, 6 blades may be picked from the pool of 8 available blades and it may be ensured that CDL cluster management blades may reside in different BTAS cluster as well as chassis. This may be done to enable chassis level redundancy of CDL management blades. In this example, 4 BTAS clusters pertaining to application services that desire centralized data access framework may use the CDL cluster created specifically for the particular place's traffic. In this way, each of BTAS circle may have one exclusive CDL cluster created for the location.

In an embodiment, each CDL cluster may include modules, for example, a logger manager, a system manager, and a CDL manager and other such processes. For example, the logger manager may be responsible for managing logging activity of an application and may be present in each CDL cluster blade. In another example, the system manager may be responsible for handling OAM related activity of the system and may be present only on management blades of the cluster. In another example, the CDL manager may be responsible for handling the CDL data access related requests and may be present only on payload blades of CDL cluster. In an exemplary embodiment a typical process and blade layout of one blade (single), 2 blade (dual), and 6 blade CDL cluster may be as shown in Tables 1-3 below. In this example, the layout may also capture the virtual IP requirement for the system manager and CDL manager processes.

TABLE 1

Example of Single blade layout

| Process name | Redundancy model | Rank |
|---|---|---|
| System Manager | No redundancy | NA |
| Logger Manager | No redundancy | NA |
| CDL Manager | No redundancy | NA |

TABLE 2

Example of dual blade layout

| Process name | Redundancy model | Rank | VIP |
|---|---|---|---|
| BLADE 1 | | | |
| System Manager | 2N | NA | VIP1 |
| Logger Manager | No redundancy | NA | |
| CDL Manager | N = 2, M = 2 | 1 | VIP2 |
| CDL Manager | N = 2, M = 2 | 3 | |
| BLADE 2 | | | |
| System Manager | 2N | NA | |
| Logger Manager | No redundancy | NA | |
| CDL Manager | N = 2, M = 2 | 2 | VIP3 |

TABLE 3

Example of Six blade layout

| Process name | Redundancy model | Rank | VIP |
|---|---|---|---|
| BLADE 1 | | | |
| System Manager | 2N | NA | VIP1 |
| Logger Manager | No redundancy | NA | |
| BLADE 2 | | | |
| System Manager | 2N | NA | |
| Logger Manager | No redundancy | NA | |
| BLADE 3 | | | |
| CDL Manager | N = 2, M = 4 | 1 | VIP2 |
| CDL Manager | N = 2, M = 4 | 5 | |
| BLADE 4 | | | |
| CDL Manager | N = 2, M = 4 | 2 | VIP3 |
| CDL Manager | N = 2, M = 4 | 6 | |
| BLADE 5 | | | |
| CDL Manager | N = 2, M = 4 | 3 | |
| BLADE 6 | | | |
| CDL Manager | N = 2, M = 4 | 4 | |

In an example embodiment, a CDL cluster may be created for catering circle specific centralized data access requirements and may be referred to as a circle specific CDL cluster. This implementation may enable the client application services to have centralized view of data at circle level. For example, services may use CDL framework in the circle specific CDL cluster configuration. In an alternate embodiment, there may be another requirement in which client application services may require centralized data access across different circles. For example, a centralized service may be required across a nation. This implementation may be referred to as a centralized CDL cluster.

14

Figure 5:
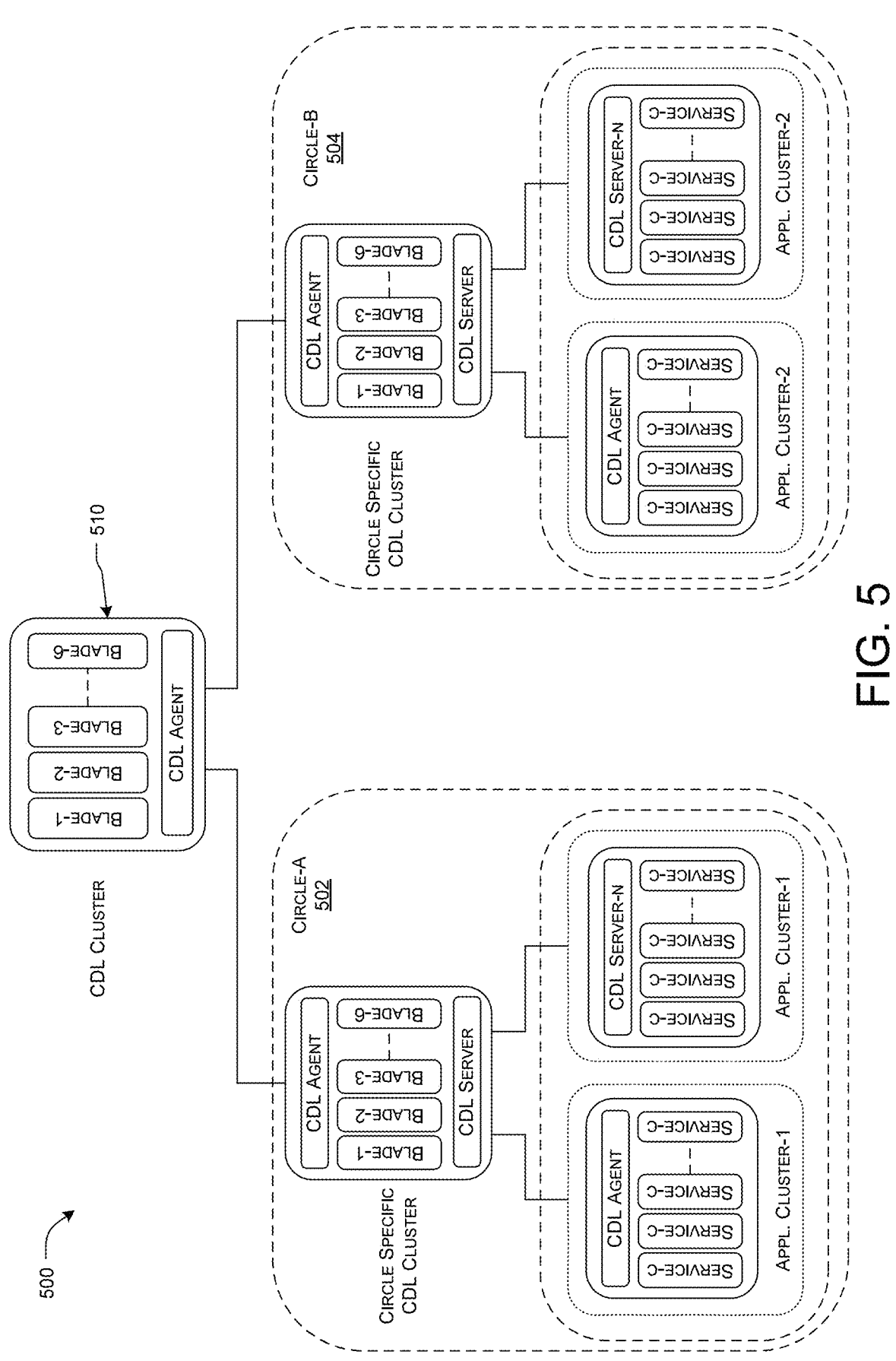
FIG. 5 illustrates an exemplary representation (500) of a circle based CDL framework, in accordance with an embodiment of the present disclosure.

FIG. 5 illustrates an exemplary representation (500) of a circle based CDL framework, in accordance with an embodiment of the present disclosure.

The CDL server as shown in FIG. 5 may be a cluster application pertaining to specific clusters corresponding to respective circles, for example, circle-A (502) and circle-B (504) may pertain to application cluster-1 and application cluster-2 respectively. It may be appreciated that for the sake of simplicity, only 2 circles (circle A and circle B are shown), however, the implementation may be applicable across various other circles. In an example embodiment, a call admission control (CAC) service may require implementation of centralized data access if enterprise presence may be scattered in different circles. In an embodiment, to suffice this requirement, the deployment shown in FIG. 5 may be used, where a CDL cluster may be created in one of the circles, whereas all other circle specific CDL clusters (pertaining to circle-A 502 and circle-B 504) may communicate with CDL agent (510). In an embodiment, each circle specific CDL cluster at circle level (502 and/or 504) may also include a CDL agent internally configured to communicate with the CDL agent (510). In an example, the CDL cluster installation configuration and output directory folder may be configured at different locations so that it may not interfere with working of existing BTAS or EPS cluster(s). In an exemplary embodiment, the CDL client library may be embedded by default inside a BTAS session manager and may further include CDL manager processes. In an alternate example embodiment, the OAM and CDL manager may function in 2N and N+M redundancy model so as to take care of any process or blade level failures, where each of the active OAM and CDL managers may require a virtual IP. Each CDL agent may contact the active CDL manager using virtual IP.

Figure 6:
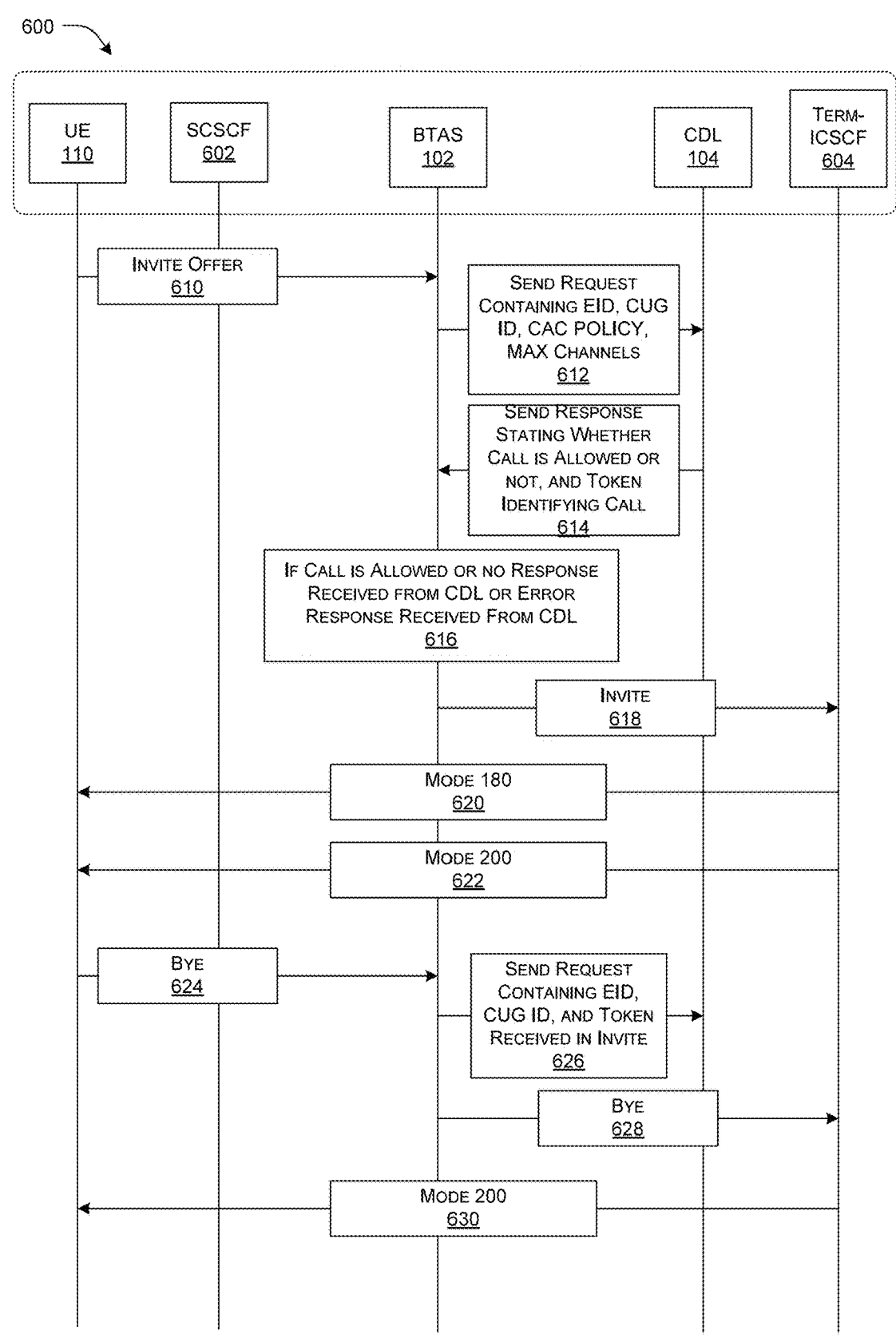
FIG. 6 illustrates an exemplary sequence diagram (600) for implementing the proposed mechanism, in accordance with an embodiment of the present disclosure.

FIG. 6 illustrates an exemplary sequence diagram of a method (600) for implementing the proposed mechanism, in accordance with an embodiment of the present disclosure.

As shown in FIG. 6, the method (600) mainly describes the key steps used by the BTAS (102) in managing communication requests from user device/user equipment (UE) (110). The communication requests may be allowed or not allowed based on an assessment performed by a CDL server (104).

At step 610: A communication request sent by the UE 110 may be forwarded to the BTAS (102) through a component of IMS i.e. S-CSCF 602.

At step 612: Based on the communication request, the BTAS (102) may forward the communication request with a set of information such as, for example, endpoint identifier (EID), a CUG ID, a CAC policy, a maximum limit of allowed channels, and other such information to the CDL server (104).

At step 614: The CDL server (104) may assess the request to check whether the communication may be allowed or not. In an exemplary embodiment, the assessment may be performed by checking if the total number of communication requests, for example, calls (in one circle or between different circles) have exceeded a pre-defined limit. Based on the assessment, if the pre-defined limit is not be exceeded, then the CDL server (104) may send a response including an indication of allowance. In an example, the CDL server (104) may also send a token as reference along with the indication of allowance for identifying the allowed communication. If response may not be received from the CDL server (104) within a pre-defined time duration, then the communication may be assumed to be allowed.

At steps 616 and 618: In case of an allowed communication or a lack of response from the CDL server (104) within the pre-defined time duration, an invite may be sent from BTAS (102) to term-I-CSCF (604).

At step 620: The term-ICSCF (604) may communicate with the user device UE (110) to initiate the communication by sending a request for communication. A ringing mode may be shown as SIP response code 180.

At step 622: The term-ICSCF (604) may send a SIP response code 200 to the UE (110).

At step 624: The UE (110) may send a message, i.e. "BYE" to the BTAS (102).

At step 626: The BTAS (102) may send the communication request including the set of information such as, for example, the EID, the CUG ID, the CAC policy, and the maximum limit of allowed channels to the CDL server (104) along with the token received at step 614.

At step 628: The BTAS (102) may send "BYE" to the term-ICSCF (604).

At step 630: The term-ICSCF (604) may send the SIP response code 200 to the UE (110).

In an embodiment, the communication request may be derived based on an original request from the UE (110). The original request may indicate a requirement to establish communication of the UE (110) with at least one entity device in the same CUG within an enterprise. The set of information may include, but not limited to, an identification pertaining to the enterprise or enterprise identification (ID), the CUG ID, the CAC policy, the maximum number of allowed communications/channels, and the pre-defined limit and other such information. Various other types of information may also be included within the scope of the present disclosure. In an example embodiment, the CAC may facilitate control on the number of communication requests that may be required to be handled simultaneously in a particular CUG or all CUGs. The communication requests may be managed based on varying CAC policy including, but not limited to, the circle based CAC policy and a centralized CAC policy. The circle based CAC policy may be applicable if an enterprise or CUG may pertain to one circle. The centralized CAC policy may be applicable if an enterprise or CUG may pertain to multiple circles. Various other CAC policies may also be possible within the scope of the present disclosure.

In an exemplary embodiment, if the maximum number of allowed channels are not breached, then the communication request may be allowed and may be added in an existing pool. Further, if the communication request is allowed, a response may be sent back from the CDL server (104) to the BTAS (102) indicating that communication is allowed.

In an alternate embodiment, if the maximum number of channels allowed are breached, then an acknowledgement may be sent back to the BTAS (102) indicating that communication is not allowed. The centralized CAC policy, upon receiving a communication request along with a set of information at the CDL server (104) may be required to include a count of parallel or concurrent communications (such as ongoing calls) initiated in various circles. A timer configured as "RT_CDL_CENTRLSD_DATA_REFRESH_TIM" may be started by the CDL server of each circle for each enterprise/CUG with the CAC policy. The timer may define a time duration having a pre-determined value. After expiry of the time duration, the CDL server of circle may send a message to CDL cluster where the first message may include details regarding, ongoing concurrent calls in its circle, enterprise ID, CUG ID, and other such details. Upon receiving the first message by the CDL cluster, assessment may be performed at the CDL cluster. For example, the CDL cluster may sum up the concurrent call value received to a "cumulative count" that may have been maintained after receiving messages from other circles with the same enterprise and CUG. Based on this assessment, the CDL cluster may send a second message to the CDL server, where the second message may include the cumulative count saved by the CDL server. Thus, the CDL server may assess whether the communication request may be allowed or not, based on the cumulative count obtained from CDL cluster. Further, when a communication request is not allowed or disconnected, a trigger may be sent to the CDL server in its circle which may then remove the call entry made at the time of call initiation. In an alternate embodiment, when no response is received from the CDL server within a configured time interval (for example, configured in parameter "RT_AS_CAC_WAIT_TIMER") then the communication may be continued or assumed to be allowed by the BTAS (102).

Figure 7:
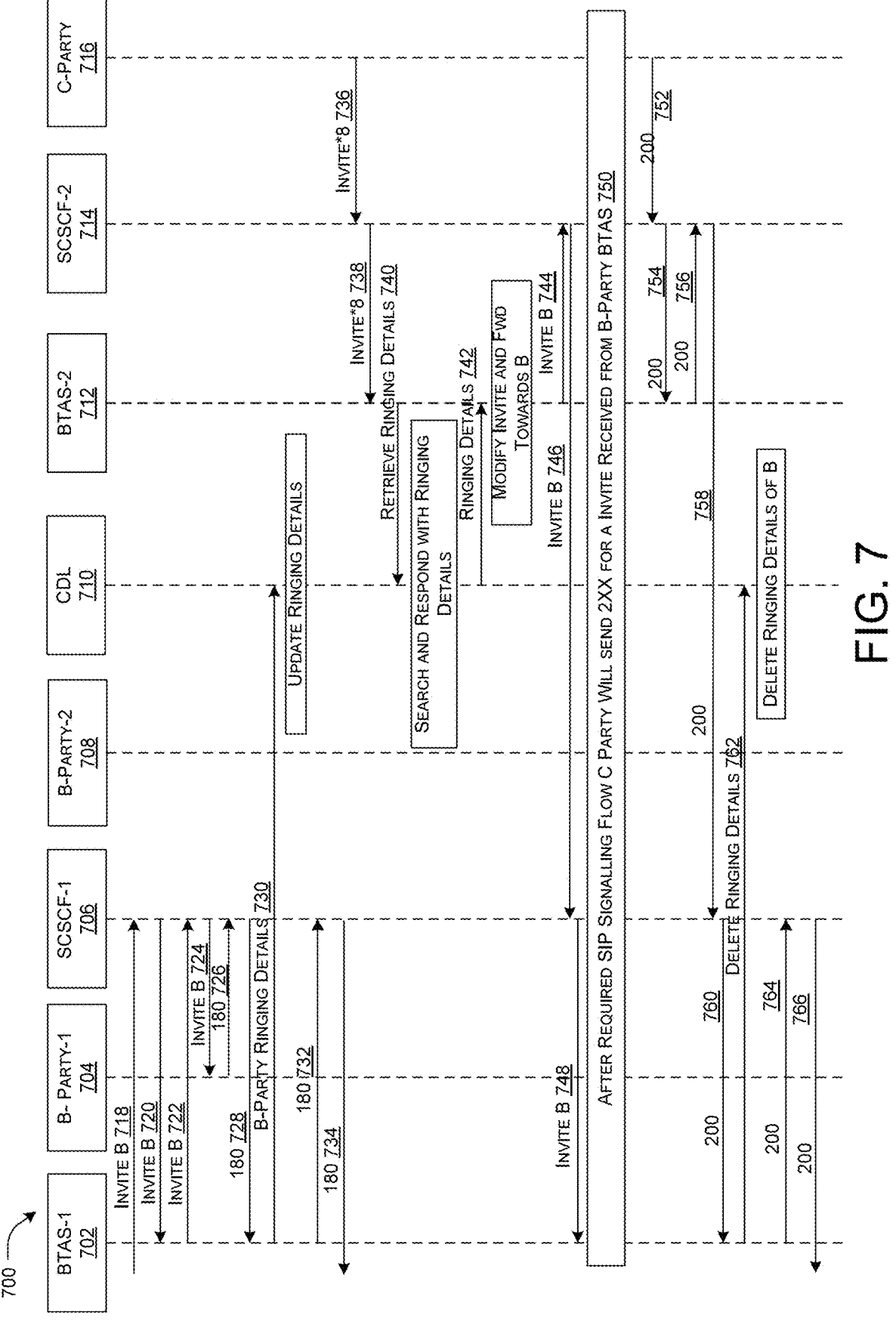
FIG. 7 illustrates an exemplary sequence diagram (700) for the CDL handling multiple calls, in accordance with an embodiment of the present disclosure.

FIG. 7 illustrates an exemplary sequence diagram of a method (700) for the CDL handling multiple calls, in accordance with an embodiment of the present disclosure.

At step 718: The UE may send an invite to the SCSCF-1 (706) through BTAS-1 (702).

At step 720: The SCSCF-1 (706) may send an invite to the BTAS-1 (702).

At step 722: The BTAS-1 (702) may send an invite to the SCSCF-1 (706).

At step 724: The SCSCF-1 (706) may send an invite to a B Party-1 (704).

At step 726: The B party-1 (704) may send an SIP code 180 to the SCSCF-1 (706).

At step 728: The SCSCF-1 (706) may send the SIP code 180 to the BTAS-1 (702).

At step 730: The BTAS-1 (702) may send the ringing details to the CDL (710) and the CDL (710) may update the ringing details.

At step 732: The BTAS-1 (702) may send the SIP code to the SCSCF-1 (706).

At step 734: The SCSCF-1 (706) may send the SIP code 180 back to the UE.

At step 736: A C party (716) may send an invite to the SCSCF-2 (714).

At step 738: The SCSCF-2 (714) may send an invite to the BTAS-2 (712).

At step 740: The BTAS-2 (702) may retrieve the ringing details and send it to the CDL (710). The CDL (710) may search and respond with ringing details.

At step 742: The CDL (710) may send the ringing details to the BTAS-2 (712). The BTAS-2 (712) may modify the invite and forward the invite to the B party-1 (704) or Bparty-2 (708).

At step 744: The BTAS-2 (712) may send the invite to the SCSCF-2 (714).

At step 746: The SCSCF-2 (714) may send the invite to the SCSCF-1 (706).

At step 748: The SCSCF-1 (706) may send the invite to the BTAS-1 (702).

At step 750: The C party (716) may send a "2XX" for an invite sent by the BTAS-1 (702).

At step 752: The C party (716) may send an SIP code 200 to the SCSCF-2 (714).

At step 754: The SCSCF-2 (714) may send the SIP code 200 to the BTAS-2 (712).

At step 756: The BTAS-2 (712) may send the SIP code 200 back to the SCSCF-2 (714).

At step 758: The SCSCF-2 (714) may send the SIP code 200 to the SCSCF-1 (706).

At step 760: The SCSCF-1 (706) may send the SIP code 200 to the BTAS-1 (702) and delete the ringing details.

At step 762: The BTAS-1 (702) may delete the ringing details of the B party-1 (704) or B party-2 (708) and send it to the CDL (710).

At step 764: The BTAS-1 (702) may send the SIP code 200 to the SCSCF-1 (706).

At step 766: The SCSCF-1 (706) may send the SIP code 200 to the UE.

Figure 8:
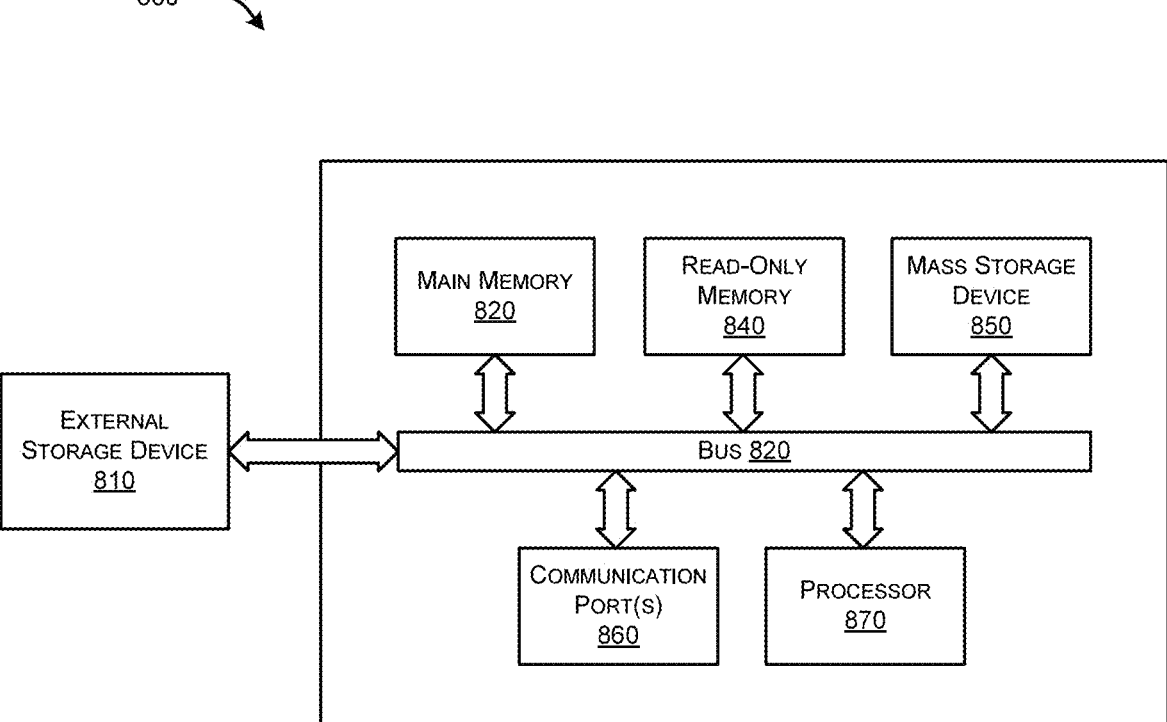
FIG. 8 illustrates an exemplary computer system (800) in which or with which the proposed system may be implemented, in accordance with an embodiment of the present disclosure.

FIG. 8 illustrates an exemplary computer system (800) in which or with which the proposed system may be implemented, in accordance with an embodiment of the present disclosure.

As shown in FIG. 8, the computer system (800) may include an external storage device (810), a bus (820), a main memory (830), a read-only memory (840), a mass storage device (850), a communication port(s) (860), and a processor (870). A person skilled in the art will appreciate that the computer system (800) may include more than one processor and communication ports. The processor (870) may include various modules associated with embodiments of the present disclosure. The communication port(s) (860) may be any of an RS-232 port for use with a modem-based dialup connection, a 10/100 Ethernet port, a Gigabit or 10 Gigabit port using copper or fiber, a serial port, a parallel port, or other existing or future ports. The communication ports(s) (860) may be chosen depending on a network, such as a Local Area Network (LAN), Wide Area Network (WAN), or any network to which the computer system (800) connects.

In an embodiment, the main memory (830) may be Random Access Memory (RAM), or any other dynamic storage device commonly known in the art. The read-only memory (840) may be any static storage device(s) e.g., but not limited to, a Programmable Read Only Memory (PROM) chip for storing static information e.g., start-up or basic input/output system (BIOS) instructions for the processor (870). The mass storage device (850) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external. e.g., having Universal Serial Bus (USB) and/or Firewire interfaces).

In an embodiment, the bus (820) may communicatively couple the processor(s) (870) with the other memory, storage, and communication blocks. The bus (820) may be, e.g. a Peripheral Component Interconnect PCI)/PCI Extended (PCI-X) bus, Small Computer System Interface (SCSI), USB, or the like, for connecting expansion cards, drives, and other subsystems as well as other buses, such a front side bus (FSB), which connects the processor (870) to the computer system (800).

In another embodiment, operator and administrative interfaces, e.g., a display, keyboard, and cursor control device may also be coupled to the bus (820) to support direct operator interaction with the computer system (800). Other operator and administrative interfaces can be provided through network connections connected through the communication port(s) (860). Components described above are meant only to exemplify various possibilities. In no way should the aforementioned exemplary computer system (800) limit the scope of the present disclosure.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter is to be implemented merely as illustrative of the disclosure and not as a limitation.

Advantages of the Invention

The present disclosure provides a system and a method that uses a business telephony application server (BTAS) that provides session initiation protocol (SIP) trunking and internet protocol (IP) centrex services to customers.

It is an advantage of the present disclosure to provide a system and a method that uses the BTAS to provide supplementary services like a closed user group (CUG), short code dialling, and conferencing to customers.

It is an advantage of the present disclosure to provide a system and a method with BTAS that uses a call admission control (CAC) service to simultaneously control a number of calls in a particular CUG.

It is an advantage of the present disclosure to provide a system and a method with BTAS that uses a circle based CAC with a centralized data layer (CDL) server that keeps an account of the number of calls in a circle based CAC.

It is an advantage of the present disclosure to provide a system and a method that uses BTAS with a circle based CDL for catering circle specific data access requirements.

It is an advantage of the present disclosure to facilitate an effective and improved management of traffic volume pertaining to communication requests.

It is an advantage of the present disclosure to facilitate an economical and next generation based system and a method that can eliminate network congestion or overload due to excess traffic, thus making the network service to improve the efficiency and quality of the service.

It is an advantage of the present disclosure to facilitate a system and a method that can enable managing volume of communication requests within a circle or between multiple circles.

We claim:

1. A system for establishing one or more connections, the system comprising:
   one or more processors operatively coupled with a business telephony application server (BTAS), wherein the one or more processors are coupled with a memory, and wherein said memory stores instructions which when executed by the one or more processors causes the one or more processors to:
   receive one or more communication requests from one or more user devices via a communication network, wherein the one or more communication requests are based on one or more input parameters;
   transmit the one or more communication requests to a centralized data layer (CDL) server via the communication network, wherein the CDL server is configured to approve the received one or more communication requests based on one or more predefined rules;
   receive the approved one or more communication requests from the CDL server via the communication network; and
   establish the one or more connections between the one or more user devices and BTAS based on the approved one or more communication requests.

2. The system as claimed in claim 1, wherein the one or more processors are configured to process the received one or more communication requests and enable one or more service chain logic executions associated with the received one or more communication requests.

3. The system as claimed in claim 1, wherein the one or more processors are configured to manage fault, configuration, and performance associated with the received one or more communication requests.

4. The system as claimed in claim 1, wherein the one or more processors are configured to store one or more database clusters and update changes associated with the received one or more communication requests in the one or more database clusters.

5. The system as claimed in claim 4, wherein the one or more processors are configured to debug the one or more database clusters associated with the received one or more communication requests.

6. The system as claimed in claim 1, wherein the CDL server is configured with one or more call admission control (CAC) services to process the received one or more communication requests.

7. The system as claimed in claim 1, wherein the CDL server is configured with any or a combination of a circle based call admission control (CAC) service and a centralized CAC service to process the received one or more communication requests.

8. The system as claimed in claim 1, wherein the one or more input parameters comprise at least one of enterprise identification (ID), closed user group (CUG) ID, call admission control (CAC) policies, and one or more channels used by the CAC policies.

9. The system as claimed in claim 1, wherein the one or more predefined rules of the CDL server are based on one or more verifications from an external server, and wherein the external server is configured to verify the one or more input parameters associated with the one or more user devices.

10. The system as claimed in claim 9, wherein the CDL server is configured with a timer to record the one or more communication requests from the one or more user devices and transmit the one or more communication requests to the external server for the one or more verifications.

11. The system as claimed in claim 6, wherein the one or more CAC services comprise at least one CAC cluster to process the one or more communication requests.

12. A method for establishing one or more connections, said method comprising:

receiving, by one or more processors operatively coupled with a business telephony application server (BTAS), one or more communication requests from one or more user devices via a communication network, wherein the one or more communication requests are associated with one or more input parameters;

transmitting, by the one or more processors, the one or more communication requests to a centralized data layer (CDL) server via the communication network, wherein the CDL server is configured to approve the one or more communication requests based on one or more predefined rules;

receiving, by the one or more processors, the approved one or more communication requests from the CDL server via the communication network; and establishing, by the one or more processors, the one or more connections between the one or more user devices and the BTAS based on the approved one or more communication requests.

13. The method as claimed in claim 12, comprising processing, by the one or more processors, the one or more communication requests and enabling one or more service chain logic executions associated with the one or more communication requests.

14. The method as claimed in claim 12, comprising managing, by the one or more processors, fault, configuration, and performance associated with the one or more communication requests.

15. The method as claimed in claim 12, comprising storing, by the one or more processors, one or more database clusters and updating changes associated with the one or more communication requests in the one or more database clusters.

16. The method as claimed in claim 15, comprising debugging, by the one or more processors, the one or more database clusters associated with the one or more communication requests.

17. A user equipment (UE) for establishing one or more connections, said UE comprising:

one or more processors communicatively coupled to one or more processors in a system, wherein the one or more processors are coupled with a memory, and wherein said memory stores instructions which when executed by the one or more processors causes the UE to:

transmit one or more communication requests to the one or more processors via a communication network, wherein the one or more processors are operatively coupled to a business telephony application server (BTAS), and wherein the one or more processors are configured to:

receive the one or more communication requests from the UE;

transmit the one or more communication requests to a centralized data layer (CDL) server via the communication network, wherein the CDL server is configured to approve the one or more communication requests based on one or more predefined rules;

receive the approved one or more communication requests from the CDL server via the communication network; and establish the one or more connections between the UE and the BTAS based on the approved one or more communication requests.

18. A non-transitory computer readable medium comprising a processor with executable instructions, causing the processor to:

receive one or more communication requests from one or more user devices via a communication network, wherein the one or more communication requests are based on one or more input parameters;

transmit the one or more communication requests to a centralized data layer (CDL) server via the communication network, wherein the CDL server is configured to approve the received one or more communication requests based on one or more predefined rules;

receive the approved one or more communication requests from the CDL server via the communication network; and establish one or more connections between the one or more user devices and a business telephony application server (BTAS) based on the approved one or more communication requests.

* * * * *